United States Patent [19]

Tsai

[11] Patent Number: 5,796,506

[45] Date of Patent: Aug. 18, 1998

[54] SUBMILLIMETER INDIRECT HETERODYNE RECEIVER AND MIXER ELEMENT

[76] Inventor: Charles Su-Chang Tsai, 2653 S. Daytona Ave., Hacienda Hts., Calif. 91745

[21] Appl. No.: 560,793

[22] Filed: Nov. 21, 1995

[51] Int. Cl.$^6$ ........................ H04B 10/148; H04B 10/06
[52] U.S. Cl. ...................... 359/191; 359/193; 343/721
[58] Field of Search ............................ 359/191, 192, 359/193, 189, 187, 325; 343/721

[56] References Cited

U.S. PATENT DOCUMENTS

| | | | |
|---|---|---|---|
| 3,132,258 | 5/1964 | Gaertner et al. | 307/88 |
| 3,196,274 | 7/1965 | Giordmaine | 250/199 |
| 3,379,888 | 4/1968 | Rossoff | 250/199 |
| 3,404,279 | 10/1968 | Mataré | 250/199 |
| 3,755,678 | 8/1973 | Javan | 250/211 J |
| 3,970,839 | 7/1976 | Javan | 250/199 |
| 4,020,341 | 4/1977 | Javan | 250/211 J |
| 4,156,135 | 5/1979 | Miller, Jr. et al. | 250/199 |
| 4,805,237 | 2/1989 | Donald et al. | 455/619 |
| 4,856,095 | 8/1989 | Rauscher | 455/619 |
| 5,349,465 | 9/1994 | Mizuno | 359/325 |
| 5,379,309 | 1/1995 | Logan, Jr. | 372/18 |
| 5,401,953 | 3/1995 | Spencer et al. | 372/4 |
| 5,526,158 | 6/1996 | Lembo | 359/191 |

OTHER PUBLICATIONS

R. Blundell, et al. "Submillimeter Receivers for Radio Astronomy," Nov. 1992 pp. 1702–1720, vol. 80, No. 11, Proceedings of the IEEE.

T.W. Crowe, et al. "GaAs Schottky Diodes for THz Mixing Applications," Nov. 1992 pp. 1827–1841, vol. 80, No. 11, Proceedings of the IEEE.

M.J. Wengler, "Submillimeter–Wave Detection with Superconducting Tunnel Diodes," Nov. 1992, pp. 1810–1826, vol. 80, No. 11, Proceedings of the IEEE.

P. F. Goldsmith, "Quasi–Optical Techniques," Nov. 1992, pp. 1729–1747, vol. 80, No. 11, Proceedings of the IEEE.

G. Chin, "Optically Pumped Submillimeter Laser Heterodyne Receivers . . . ," Nov. 1992, pp. 1788–1799, vol. 80, No. 11, Proceedings of the IEEE.

E. R. Brown, et al. "Photomixing up to 3.8 $TH_z$ in low–temperature–grown GaAs," 16 Jan. 1995, pp. 285–287, vol. 66, No. 3, Applied Physics Letters.

A. V. Räisänen. "Frequency Multipliers for Millimeter and Submillimeter Wave–lengths," Nov. 1992, pp. 1842–1852, vol. 80, No. 11, Proceedings of the IEEE.

R. Blundell, et al. "Resonant Tunneling Diode Oscillator as an Alternative LO . . . ," 4 Feb. 1993, pp. 288–290, vol. 29, No. 3, Electronics Letters.

J. E. Bowers, et al. "Ultrawide–Band Long–Wavelength p–i–n Photodetectors," Oct. 1987, pp. 1339–1350, vol. LT–5, No. 5, No. 10, Journal of Lightwave Technology.

R. W. P. Drever, et al. "Laser Phase and Frequency Stabilization Using an Optical Resonator," 1983, pp. 97–105, vol. 31, Applied Physics B.

T. Day, et al. "Sub–Hertz Relative Frequency Stabilization of Two–Diode Laser . . . ," Apr. 1992, pp. 1106–1117, vol. 28, No. 4, IEEE Journal of Quantum Electronics.

*Primary Examiner*—Leslie Pascal

[57] ABSTRACT

A coherent receiver for electromagnetic radiation comprising an input optics (10) for collecting an input signal of electromagnetic radiation at a frequency $F_S$, an optical local oscillator (100) for generating an optical signal at a frequency $F_O$ amplitude-modulated at a frequency $F_{LO}$, a mixer element (60) responsive simultaneously to the frequencies $F_S$, $F_O$, and $F_{LO}$, where the input signal is injected electrically into the mixer element and the optical signal is injected optically into the mixer element to produce an output signal at a frequency $F_{IF}$ equal to the difference between $F_S$ and $F_{LO}$, and electronics (50) connected to the mixer element for processing the output signal.

20 Claims, 4 Drawing Sheets

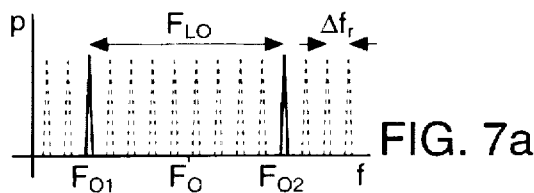
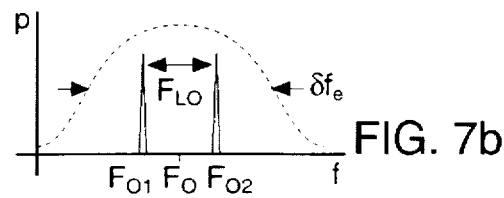
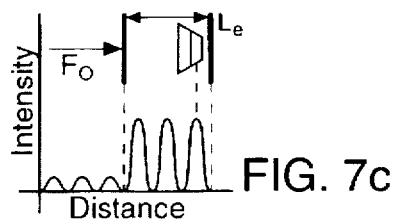
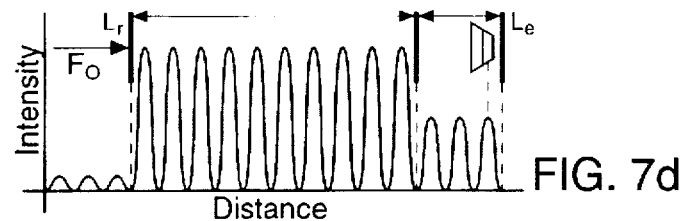
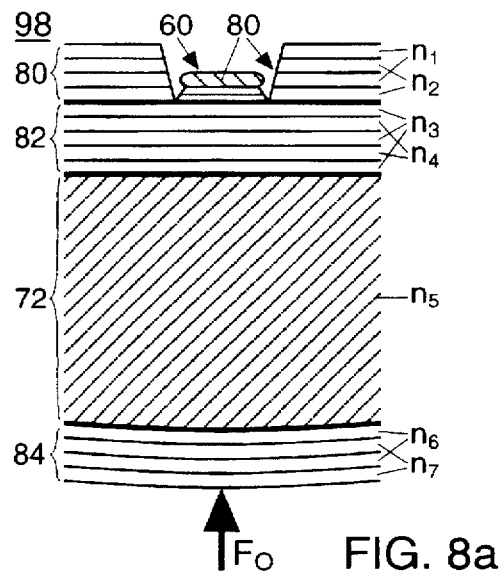
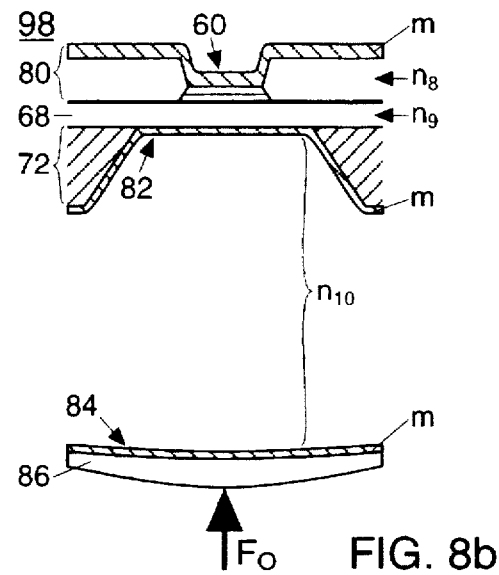
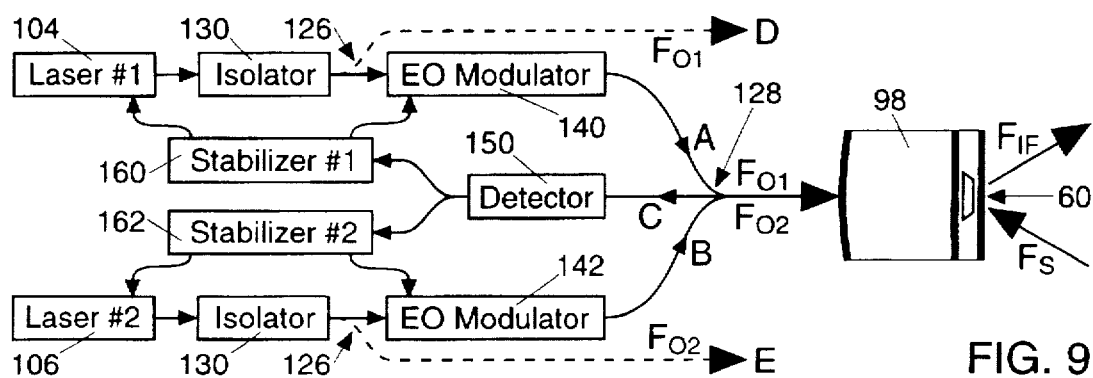

SUBMILLIMETER INDIRECT HETERODYNE RECEIVER AND MIXER ELEMENT

BACKGROUND

1. Field of Invention

The invention relates to a space-flight-compatible coherent receiver for submillimeter and far-infrared electromagnetic radiation and methods for utilizing such receiver. The invention further relates to the mixer element used within such receiver.

2. Description of Prior Art

In radio astronomy, spacecraft-borne and ground-based telescopes containing heterodyne receivers operating in the frequency range of 100 GHz to 10 THz are utilized to probe and observe the universe. FIG. 1 illustrates the basic configuration of the conventional heterodyne receiver in radio telescopes, see "Submillimeter Receivers for Radio Astronomy" by R. Blundell and C. E. Tong, Proceedings of the IEEE, Vol. 80, No. 11, November 1992, pp. 1702–1720. The receiver is divided into several subsystems, input optics 10, local oscillator (LO) 20, diplexer 30, mixer element 40, and electronics 50.

Input optics 10, for example a telescope, contains several reflectors to focus an extremely weak input signal at frequency $F_S$ into a beam directed at diplexer 30. Local oscillator 20 produces an intense beam at frequency $F_{LO}$ also directed at diplexer 30. Diplexer 30, for example a Martin-Puplett interferometer, combines the two beams at frequencies $F_S$ and $F_{LO}$ into one beam directed at mixer element 40. The two signals at frequencies $F_S$ and $F_{LO}$ are injected into mixer element 40 as oscillating electrical currents by an antenna, usually integrated with or connected directly to mixer element 40. By mixing in a nonlinear element responsive electrically to frequencies $F_S$ and $F_{LO}$, mixer element 40 produces an output signal at a lower frequency $F_{IF}$ that is equal to the difference between $F_S$ and $n \times F_{LO}$, where integer n=1 for most cases except harmonic mixers, where n>1. The output of mixer element 40 is connected to electronics 50 for further signal processing, such as amplification, filtration, and/or spectral analysis.

For the wide-instantaneous-bandwidth submillimeter receivers currently in use, mixer element 40 is usually one of the following devices: (1) semiconductor Schottky-barrier diodes (SBD), see "GaAs Schottky Diodes for THz Mixing Applications" by T. W. Crowe, R. J. Mattauch, H. P. Röser et al, Proceedings of the IEEE, Vol. 80, No. 11, November 1992, pp. 1827–1841; (2) liquid-helium-cooled superconductor-insulator-superconductor (SIS) junctions, see "Submillimeter-Wave Detection with Superconducting Tunnel Diodes" by M. J. Wengler, Proceedings of the IEEE, Vol. 80, No. 11, November 1992, pp. 1810–1826. SIS devices can be used as mixer element 40 for frequency $F_S$ up to 1 THz, and require up to 10 μW of LO pump power per device. SBD devices are used as mixer element 40 exclusively for frequency $F_S$ over 1 THz, while requiring up to 1 mW of LO pump power per device. Input beam at frequencies $F_S$ and $F_{LO}$ can be waveguide-coupled to the SIS or SBD devices for frequency $F_S<1$ THz, while quasi-optical coupling techniques are used exclusively for frequency $F_S>1$ THz, see "Quasi-Optical Techniques" by P. F. Goldsmith, Proceedings of the IEEE, Vol. 80, No. 11, November 1992, pp. 1729–1747.

Local oscillator 20 is selected from the following submillimeter-wave sources: (1) optically-pumped far-infrared laser (OPFIRL), see "Optically Pumped Submillimeter Laser Heterodyne Receivers: Astrophysical Observations and Recent Technical Developments" by G. Chin, Proceedings of the IEEE, Vol. 80, No. 11, November 1992, pp. 1788–1799; (2) optical photomixing in low-temperature-grown (LTG) GaAs photoconductor, see "Photomixing up to 3.8 THz in low-temperature-grown GaAs" by E. R. Brown, K. A. McIntosh, K. B. Nichols, and C. L. Dennis, Applied Physics Letters, Vol. 66, No. 3, Jan. 16, 1995, pp. 285–287; (3) frequency multiplier using semiconductor varactor pumped by high-power microwave GUNN oscillators, see "Frequency Multipliers for Millimeter and Submillimeter Wavelengths" by A. V. Räisänen, Proceedings of the IEEE, Vol. 80, No. 11, November 1992, pp. 1842–1852; (4) resonant tunneling diode oscillators, see "Resonant Tunneling Diode Oscillator as an Alternative LO for SIS Receiver Applications" by R. Blundell, D. C. Papa, E. R. Brown, and C. D. Parker, Electronics Letters, Vol. 29, No. 3, Feb. 4, 1993, pp. 288–290. Thus far only OPFIRL and optical photomixing have demonstrated any usable output power at frequency $F_{LO}>1$ THz. OPFIRL is the only source producing output power>1 mW at frequency $F_{LO}>1$ THz.

Although adequate for ground-based telescopes, the conventional submillimeter heterodyne receiver described thus far is plagued by low reliability, frequent maintenance, low power efficiency, high power consumption, heavy weight, and large size. In order for a receiver to be space-flight-compatible, it has to be reliable, compact, rugged, light weight, and power efficient. After surviving the tremendous stress and strain of its initial launch, the receiver must maintain stable, accurate, narrow-linewidth, single-frequency performance over an extended period of time without any maintenance or manual recalibration in the extremely harsh environment of space. None of the current receivers meet these requirements, especially for frequency $F_S>1$ THz:

(a) Combining LO and input efficiently requires elaborate diplexer, requiring extra space.

(b) The diplexer must be tuned to each specific frequency $F_{LO}$ to minimize coupling losses.

(c) Reliability of OPFIRL in space is problematic; solid-state technology is much preferred.

(d) OPFIRL is not continuously tunable, since it lases only at molecular transitions of a gas.

(e) OPFIRL power conversion is extremely inefficient, resulting in high power consumption.

(f) OPFIRL is by far the heaviest and the largest subsystem in a THz heterodyne receiver.

(g) OPFIRL requires frequent maintenance and tuning to maximize power output.

(h) Complex and fragile gas-laser tubes and optics in OPFIRL are not suited to space launch.

(i) SIS mixers need refrigeration to liquid-helium temperatures while aboard a spacecraft.

(j) No LO produces mW-level output at frequencies above 1 THz except OPFIRL.

OBJECTS AND ADVANTAGES

It is accordingly an object of the invention to eliminate the above disadvantages of the conventional submillimeter heterodyne receiver. Several objects and advantages of the invention are:

(a) Diplexer for combining LO and input signals is eliminated.

(b) Receiver can be made based entirely on reliable solid-state technology.

3

(c) Receiver frequency is tunable, either continuously or in small discrete steps.

(d) Power consumption is minimized.

(e) Receiver can be made extremely compact and light-weight.

(f) Optimal receiver operation is simple and straightforward with no maintenance required.

(g) Liquid-helium temperatures are not required for receiver operation.

Other objects of the invention are to provide versatile coherent receivers useful for submillimeter and far-infrared spectroscopy. Besides spacecraft-borne radio telescopes, the invention provides coherent receivers that can be made quite inexpensively for many cost-sensitive applications with less-demanding requirements. The invention would allow THz spectrometers to be as popular in laboratories as radio spectrum analyzers.

Further objects and advantages of the invention will become apparent from a consideration of the drawings and ensuing description.

DESCRIPTION OF DRAWINGS

FIG. 7a is a spectrum of optical LO output and several reference cavity modes.

FIG. 7b is a spectrum of optical LO output and an enhancement cavity mode.

FIG. 7c is an optical intensity profile versus distance inside an enhanced mixer.

FIG. 7d is an optical intensity profile versus distance inside another enhanced mixer.

FIGS. 8a and 8b are sectional views of two embodiments of an enhanced mixer according to the invention.

FIG. 9 is a schematic diagram of an indirect heterodyne receiver utilizing a stabilized optical LO and an enhanced mixer according to the invention.

DESCRIPTION AND OPERATION OF INVENTION

1. Basic receiver configuration

Figure 1:
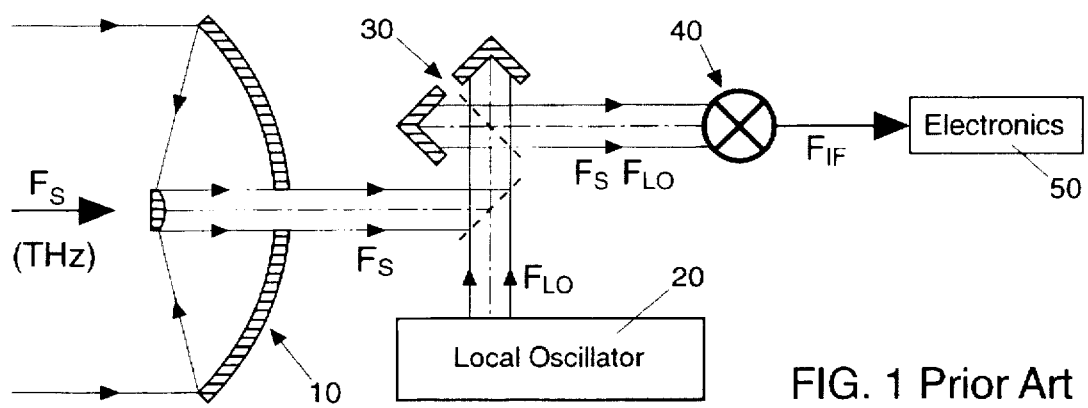
FIG. 1 is a prior-art schematic diagram of a conventional submillimeter heterodyne receiver.
Figure 2:
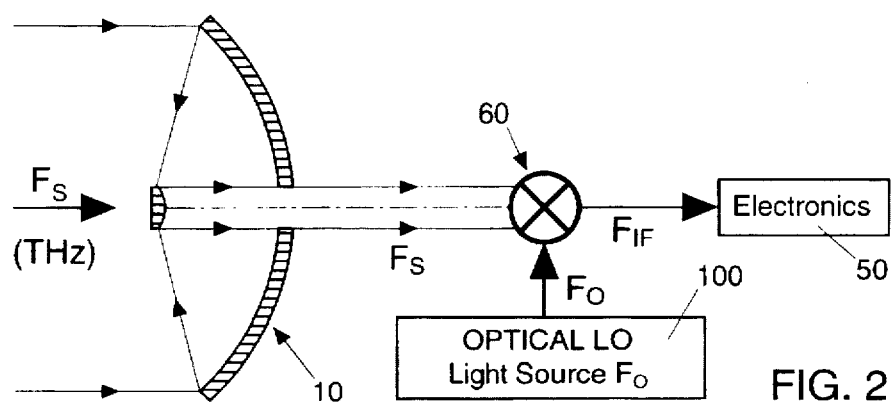
FIG. 2 is a schematic diagram of an indirect heterodyne receiver according to the invention.

FIG. 2 illustrates the basic configuration of a submillimeter indirect heterodyne receiver according to the invention. The receiver is divided into several subsystems, input optics 10, optical local oscillator (LO) 100, mixer element 60, and electronics 50. Submillimeter-wave is loosely

4 defined as the frequency range from 100 GHz to 10 THz. Optical-wave is loosely defined as the wavelength range from 10 μm to 0.1 μm.

Input optics 10, for example a telescope, contains several reflectors to focus an extremely weak input signal, for example 50 pW, at frequency $F_S$ into a beam directed at mixer element 60. The signal at frequency $F_S$ is injected into mixer element 60 as an oscillating electrical current by an antenna, usually integrated with or connected directly to mixer element 60. Optical LO 100 produces an intense optical beam, for example 1 mW, centered around frequency $F_O$, strongly amplitude-modulated at frequency $F_{LO}$, preferably at 100% modulation, and optically coupled into mixer element 60, where $F_O \gg F_S$ and $F_O \gg F_{LO}$, or $F_O > 10\ F_S$ and $F_O > 10\ F_{LO}$. By mixing in mixer element 60 responsive simultaneously to frequencies $F_S$, $F_O$, and $F_{LO}$, mixer element 60 produces an output signal at a lower frequency $F_{IF}$ that is equal to the difference between $F_S$ and $F_{LO}$. The output of mixer element 60 is connected electrically to electronics 50 for further signal processing, such as amplification, filtration, and/or spectral analysis.

The diplexer required by the conventional heterodyne receiver is eliminated, since the input signal at frequency $F_S$ and the LO signal at frequency $F_O$ are injected into mixer element 60 through entirely different paths. Since optical LO 100 is used in the indirect heterodyne receiver instead of a conventional LO, the LO power coupling losses suffered in the conventional heterodyne receiver have been eliminated, including the power losses from passing through the diplexer, the inefficient conversion of electromagnetic wave into electrical current by an antenna, and the resistive and reflective losses from the series resistance and the impedance mismatch between the antenna and the mixer element. In the indirect heterodyne receiver as described, power output from optical LO 100 is injected directly into the mixing section of mixer element 60 without any intermediate conversion that results in power loss.

2. Basic optical LO sources

Figure 3A:
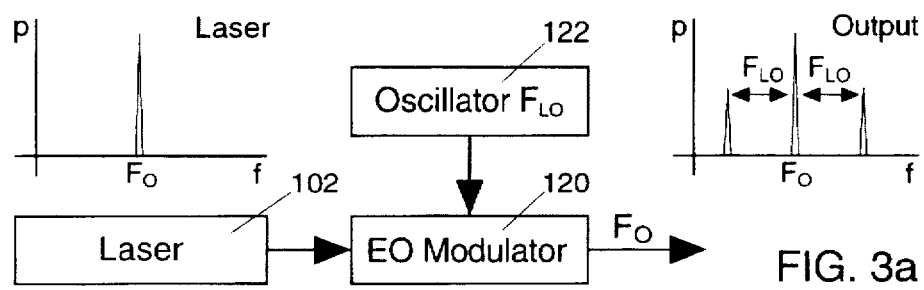
FIGS. 3a, 3b, and 3c are schematic diagrams of three optical LO sources according to the invention.

FIG. 3a illustrates an optical LO for the indirect heterodyne receiver. The optical output at frequency $F_O$ from a single-frequency laser 102, or any other nearly-monochromatic-light source, is amplitude-modulated by an electro-optical modulator 120 driven electrically at frequency $F_{LO}$ by an electrical oscillator 122, to produce an output power spectrum as shown with two side peaks spaced apart by $F_{LO}$ from the main peak at $F_O$. In the spectrums shown, vertical axis p is power and horizontal axis f is frequency. This optical LO is currently suitable only for $F_{LO} < 100$ GHz, since no electro-optical modulator is available for modulation frequencies above 100 GHz.

Figure 3B:
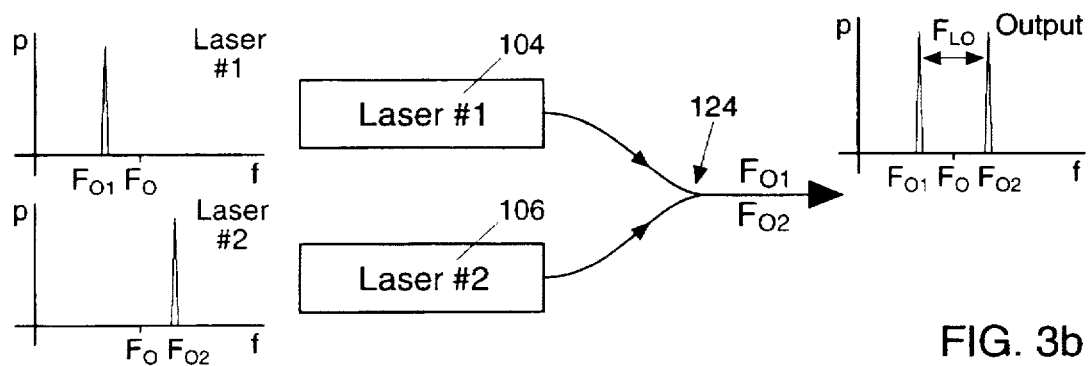

FIG. 3b illustrates the preferred optical LO for the indirect heterodyne receiver. Two optical outputs at frequencies $F_{O1}$ and $F_{O2}$ from two single-frequency lasers 104 and 106, or any other two nearly-monochromatic-light sources, are combined in an optical beam combiner 124 to produce an output power spectrum as shown with two main peaks at $F_{O1}$ and $F_{O2}$ of the same optical polarization, spaced apart by $F_{LO}$, and centered around $F_O$. In the spectrums shown, vertical axis p is power and horizontal axis f is frequency. When the two main peaks at frequencies $F_{O1}$ and $F_{O2}$ are equal in amplitude, the resulting optical output at frequency $F_O$ is an amplitude-modulated wave with 100% modulation at frequency $F_{LO}$.

Two lasers 104 and 106 can be any two nearly-monochromatic-light sources, such as semiconductor lasers, argon-ion lasers, dye lasers, neodymium:yttrium aluminum garnet (Nd:YAG) lasers, or carbon dioxide lasers, to name a few. For a space-flight-compatible indirect heterodyne receiver, these two lasers 104 and 106 should be based entirely on solid-state technology, including semiconductor lasers based on the InGaAs/InGaAsP/InP, InGaP/InAlP/GaAs, or InGaAs/AlGaAs/GaAs material systems, erbium-doped fiber lasers pumped by InGaAs/AlGaAs/GaAs semiconductor lasers, or Nd:YAG lasers pumped by AlGaAs/GaAs semiconductor lasers.

Changing frequency $F_{LO}$ is as simple as tuning the lasing frequency of one or both lasers 104 and 106 to achieve the proper frequency spacing $F_{LO}$. Widely-tunable lasers include semiconductor lasers, erbium-doped fiber lasers, or dye lasers. For example, a tuning range of 500 GHz in $F_{LO}$ requires a wavelength shift of only 4 nm for an InGaAsP/InP semiconductor laser operating at the wavelength of 1.55 µm for telecommunication. This small wavelength shift is easily and reproducibly achieved by changing the operating temperature and/or operating current of a semiconductor laser. Other tuning techniques include rotating gratings or adjusting optical filters inside a laser cavity to select different lasing frequencies.

Figure 3C:
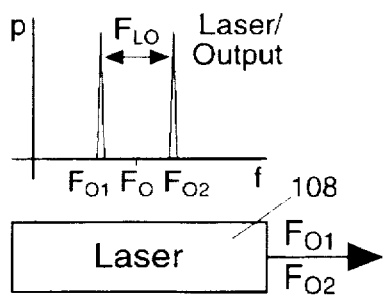

FIG. 3c illustrates another optical LO for the indirect heterodyne receiver, where a laser 108 simultaneously produces optical outputs at frequencies $F_{o1}$ and $F_{o2}$. One candidate for laser 108 could be a multi-mode Fabry-Perot laser simultaneously lasing at adjacent modes of the laser cavity where $F_{LO}$ would be equal to the mode spacing (free spectral range). A multi-mode laser introduces several difficulties, including amplitude mismatch between optical outputs at $F_{o1}$ and $F_{o2}$, and large linewidth at frequency $F_{LO}$ when lasing occurs at more than two modes. A multi-mode laser would be useful where the receiver specification does not require narrow linewidth or stable operation. Another possible candidate for laser 108 could be a laser specifically designed to sustain two selectable lasing modes, usually realized by incorporating an optically-birefringent beam-splitter and a movable grating to select two different lasing modes within a laser. However, this type of laser does not offer the flexibility or the ease of use as offered by the two-laser optical LO illustrated in FIG. 3b.

3. Basic mixer element

Figure 4A:
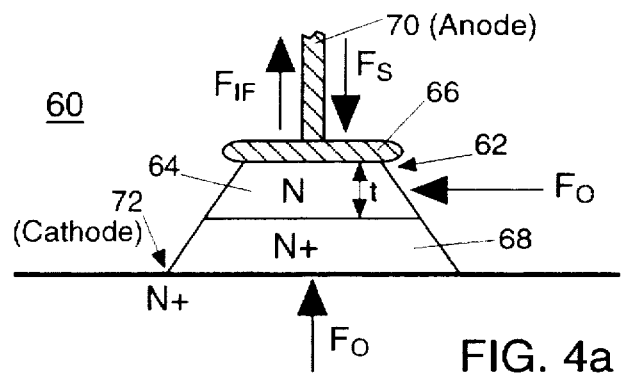
FIG. 4a is a sectional view of a basic mixer element according to the invention.

FIG. 4a illustrates the basic mixer element 60 for use in the indirect heterodyne receiver. Mixer element 60 comprises: a Schottky barrier 62, a lightly-n-doped (N) semiconductor mixing section 64 with thickness t, a metal contact 66, and a heavily-n-doped (N+) contact section 68. In addition, a metal wire 70 (Anode) and a heavily-n-doped (N+) semiconductor substrate 72 (Cathode) are shown.

Two possible paths that the optical output at frequency $F_O$ from optical LO 100 could be injected into mixer element 60 are indicated in the diagram, one path through substrate 72 and another from the side of mixer element 60. For optical LO injection through substrate 72, either substrate 72 is transparent at frequency $F_O$ or it is removed or etched away during fabrication of mixer element 60. Optical output from optical LO 100 can be carried by an external optical fiber or a waveguide integrated with mixer element 60 on substrate 72.

Mixing section 64 comprises semiconductor materials optically absorbing at frequency $F_O$, while contact section 68 comprises semiconductor materials optically transparent at frequency $F_O$. Input signal at frequency $F_S$ and output signal at frequency $F_{IF}$ are electrically conducted into and out of mixer element 60 through metal wire 70.

Figure 4B:
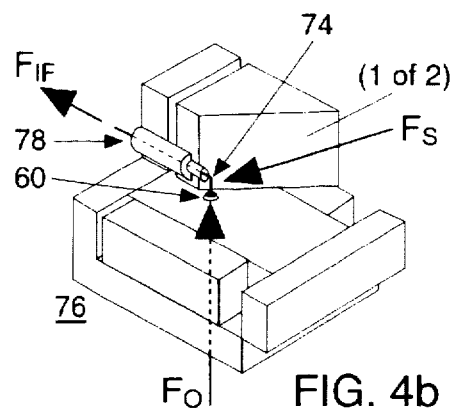
FIG. 4b is a perspective view of a corner-cube antenna suitable for the mixer element according to the invention.
Figure 4C:
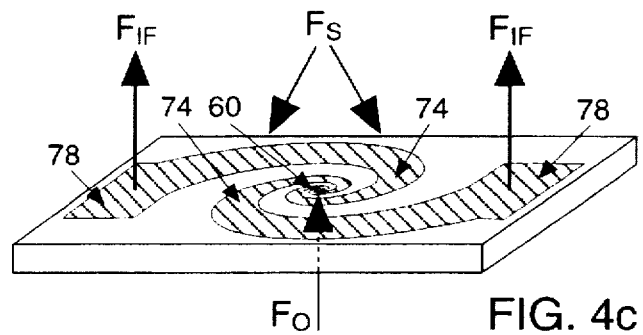
FIG. 4c is a perspective view of a planar logarithmic-spiral antenna suitable for the mixer element according to the invention.

The signal at frequency $F_S$ is injected into mixer element 60 as an oscillating electrical current by an antenna, usually integrated with or connected directly to mixer element 60. Two suitable antennas for mixer element 60 are shown in FIGS. 4b and 4c, for more details and other alternatives see references by R. Blundell and C. E. Tong, by T. W. Crowe et al, by M. J. Wengler, and by A. V. Räisänen as cited earlier for the conventional heterodyne receiver.

In the corner-cube antenna illustrated in FIG. 4b, a long-wire traveling-wave antenna 74 as an extension of metal wire 70 is placed in a corner-cube assembly 76. One of the two reflectors in assembly 76 is removed from the drawing to reveal an output connection 78 for the output signal at frequency $F_{IF}$. The input signal at frequency $F_S$ is directed to assembly 76 by input optics 10 and then reflected onto antenna 74 by the reflectors in assembly 76. Antenna 74 converts the incident electromagnetic radiation at frequency $F_S$ into an oscillating electrical current at frequency $F_S$. Also shown in FIG. 4b, the optical output at frequency $F_O$ from optical LO 100 is injected directly into mixer element 60 through the substrate (bottom side) of mixer element 60.

In the planar logarithmic-spiral antenna illustrated in FIG. 4c, a patterned metal film that is integrated with mixer element 60 simultaneously functions as an antenna 74 and metal wire 70. The output connections 78 for the output signal at frequency $F_{IF}$ are as indicated. The input signal at frequency $F_S$ is directed onto antenna 74 by input optics 10. Antenna 74 converts the incident electromagnetic radiation at frequency $F_S$ into an oscillating electrical current at frequency $F_S$. Also shown in FIG. 4c, the optical output at frequency $F_O$ from optical LO 100 is injected directly into mixer element 60 through the substrate (bottom side) of mixer element 60.

Optical input at $F_O$ generates electron-hole pairs in mixing section 64 in proportion to the amplitude modulation at $F_{LO}$. The electron-hole pairs directly mix with the electrical input signal at frequency $F_S$ in mixing section 64 and Schottky barrier 62 to produce an electrical output signal at a lower frequency $F_{IF}$. A forward-bias current through mixer element 60 is maintained through metal wire 70 for proper operation, although this bias current may be reduced or even completely eliminated in certain conditions since the optical input at frequency $F_O$ also generates a net direct current bias in mixer element 60 that is proportional to the average power of the optical input.

For mixer element 60 to operate at submillimeter-wave frequencies $F_S$ and $F_{LO}$, for example at around 1 THz, series resistance and junction capacitance associated with mixer element 60 must be reduced to a minimum. Series resistance results in thermal noise and long RC time constants. Thin transparent metal contacts used in conventional photodiodes result in high series resistance, therefore a transparent metal contact cannot be used for mixer element 60. Series resistance is minimized by thick metal contact 66 and heavily-n-doped contact section 68 and substrate 72. Capacitance is minimized by reducing total device area and by eliminating unnecessary metallization that increases parasitic capacitance between metal contact 66 and substrate 72. The trapezoidal cross-sectional shape of mixing section 64 and contact section 68 shown in FIG. 4a increases the distance between metal contact 66 and substrate 72 to decrease parasitic capacitance while maintaining low series resistance. Typical device area measured at mixing section 64 for a mixer element 60 operating at frequencies $F_S$, $F_{LO}$~1 THz is around 0.5~2 µm². Typical doping levels for N+ contact section 68 and N+ substrate 72 are $1\sim5\times10^{18}/cm^3$ or higher.

One critical parameter for mixer element 60 is the thickness t of mixing section 64. If thickness t is too large for frequencies $F_S$ and $F_{LO}$, the series resistance would increase significantly while unnecessary optical LO power at $F_O$ would be absorbed without contributing to the mixing process. If thickness t is too small for frequencies $F_S$ and $F_{LO}$, the junction capacitance associated with mixer element 60 would increase while optical LO power absorption would be reduced, thereby requring a much more intense optical LO beam at frequency $F_O$. Maximum limit of thickness t is determined by the transit time required by electrons to pass through mixing section 64. For example, if mixing section 64 is $In_{0.53}Ga_{0.47}As$ with maximum electron-drift velocity of $v_n=2.1 \times 10^7$ cm/s and frequency $F_{LO}$ is 1 THz, thickness t must be less than $t_m=v_n/F_{LO}=210$ nm, preferably 105 nm or less. In this respect, mixer element 60 is similar to a conventional photodiode, see "Ultrawide-Band Long-Wavelength p-i-n Photodetectors" by J. E. Bowers and C. A. Burrus, Journal of Lightwave Technology, Vol. LT-5, No. 10, October 1987, pp. 1339–1350.

Another critical parameter for mixer element 60 is the average doping level of mixing section 64. If the average doping level is too high for a thickness t, the junction capacitance would increase significantly while the mixing process is degraded, where Schottky barrier 62 becomes less ideal. If the average doping level is too low for a thickness t, the series resistance and mixer thermal noise would increase. Minimum average doping level $d_m$ required for satisfactory operation of mixer element 60 is determined by equating the approximate depletion width $w_d$ of Schottky barrier 62 at zero-bias condition, i.e. 0 V applied across metal contact 66 and substrate 72, and the maximum thickness $t_m$ as described previously:

$$w_d = \sqrt{\frac{2\epsilon_s V_{bi}}{q d_m}} = t_m$$

where $\epsilon_S$ is the dielectric permittivity of the semiconductor material used in mixing section 64, $V_{bi}$ is the built-in potential of Schottky barrier 62, and q is the electrical charge of an electron. Continuing with previous example of $In_{0.53}Ga_{0.47}As$ mixing section 64 with Au metal contact 66 at 1 THz with $t_m=210$ nm, minimum doping level $d_m$ is equal to $1.8 \times 10^{16}$/cm$^3$. For this specific example, mixing section 64 optimally should be 100 nm thick and doped to an average level of $8 \times 10^{16}$/cm$^3$ or higher. The minimum doping level constraint for mixer element 60 is different from conventional photodiodes, where the doping level constraint is a maximum level not to be exceeded that results in a fully depleted active region in a photodiode.

Mixer element 60 can be fabricated by applying well-known epitaxial techniques such as molecular beam epitaxy (MBE) or organometallic vapor-phase epitaxy (OMVPE). The trapezoidal shape shown in FIG. 4a of mixing section 64 and contact section 68 can be formed either naturally by selective epitaxy within openings of a dielectric mask, or by physically patterning planar epitaxial layers using etching techniques such as reactive-ion etching (RIE). Mixing section 64 can be composed of one semiconductor material absorbing at $F_O$ such as $In_{0.53}Ga_{0.47}As$, or multiple layers and/or graded layers that are absorbing or nonabsorbing such as multiple quantum-well structures of strained $In_{0.2}Ga_{0.8}As$ wells in GaAs fabricated by MBE or OMVPE techniques. Same considerations apply to contact section 68, except that the semiconductor materials should be nonabsorbing at frequency $F_O$. Many other equivalent structures can be generated based on the description given here.

4. Stabilization of optical LO source

For the indirect heterodyne receiver described thus far to have stable and single-frequency performance capable of resolving extremely-narrow-linewidth signals with tunable and reproducible frequency, optical LO 100 must be stabilized. For the preferred optical LO configuration illustrated in FIG. 3b, frequency spacing $F_{LO}$ must be maintained at a precise, stable value. For example, if laser 104 drifts slightly in lasing wavelength by 0.1 nm from 1.55 μm while laser 106 remains stable, this drift would result in a frequency shift of 12.5 GHz in $F_{LO}$. This frequency shift would be unacceptable for many applications of the indirect heterodyne receiver, especially in spacecraft-borne receivers where demanding specifications of receiver linewidth<0.5 MHz, short-term drift-rate<1 MHz/hour, and long-term drift-rate<10 MHz/5 years are required, for example.

Stabilization techniques that lock lasers to absolute frequency references, such as atomic transition lines, are of limited use for the two-laser optical LO. Absolute frequency drifts in center frequency $F_O$ are acceptable as long as the frequency spacing $F_{LO}$ between lasers 104 and 106 is precisely maintained.

Figure 5:
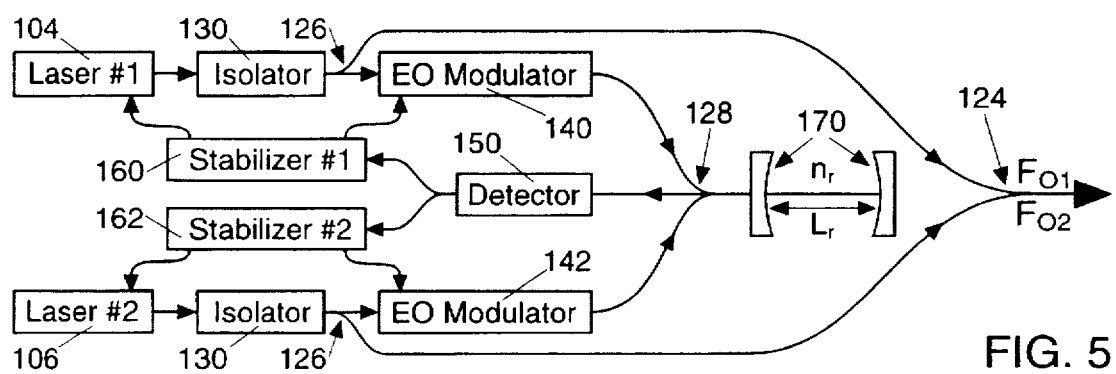
FIG. 5 is a schematic diagram of a stabilized optical LO according to the invention.

An especially advantageous stabilization configuration is to lock both lasers 104 and 106 to an optical Fabry-Perot reference cavity 170 with cavity length $L_r$, usually of high finesse, as shown in FIG. 5. Also shown in FIG. 5 is a laser-stabilization system commonly referred to as the Pound-Drever technique, see "Laser Phase and Frequency Stabilization Using an Optical Resonator" by R. W. P. Drever et al, Applied Physics B, Vol. 31, 1983, pp. 97–105. Another reference demonstrating this laser stabilization technique is "Sub-Hertz Relative Frequency Stabilization of Two Diode-Laser-Pumped Nd:YAG Lasers Locked to a Fabry-Perot Interferometer" by T. Day, E. K. Gustafson, and R. L. Byer, IEEE Journal of Quantum Electronics, Vol. 28, No. 4, April 1992, pp. 1106–1117. Other laser stabilization systems are also possible, but they suffer from drawbacks such as slow response to transients when using the transmitted beam through the reference cavity instead of the reflected beam as used in the Pound-Drever technique, or frequency drift from mismatching photodiode responses.

As illustrated in FIG. 5, optical output of laser 104 is directed through an optical isolator 130 to prevent unwanted optical feedback that would adversely affect laser oscillation. Output from isolator 130 is divided into two portions by an optical beam splitter 126. One portion is directed into an optical beam combiner 124 to form the optical LO output. Another portion is directed through an electro-optical phase-modulator 140, then through an optical beam combiner and directional coupler 128, and finally into reference cavity 170. The reflected optical beam from reference cavity 170 is directed into an optical detector 150 through coupler 128. The electrical output from detector 150 is directed into an electronic stabilizer circuit 160 for filtering, phase-sensitive heterodyne detection, and servo feedback to control laser 104 according to the Pound-Drever technique. Similar configuration also applies to laser 106 with separate isolator 130, optical beam splitter 126, electro-optical phase-modulator 142, and electronic stabilizer circuit 162, while sharing detector 150, coupler 128, cavity 170, and combiner 124. Modulators 140 and 142 are electrically driven by stabilizer circuits 160 and 162 respectively at two different frequencies larger than the mode linewidth of cavity 170 to allow distinction between two feedback signals in the electrical output of detector 150. Most of these components, including lasers 104 and 106, isolators 130, beam splitters 126, electro-optical modulators 140 and 142, detector 150, beam combiner and directional coupler 128, and beam combiner 124 can be integrated onto a semiconductor wafer using well-known techniques of integrated optics.

The Pound-Drever technique locks a laser to the center of a mode of a reference cavity. The mode-center frequencies of Fabry-Perot reference cavity 170 as shown in FIG. 5 are $$f_r = \frac{mc}{2n_r L_r}$$

where m is a positive integer, c is the speed of light in vacuum, $n_r$ is the index of refraction of the medium inside cavity 170, and $L_r$ is the cavity length. When lasers 104 and 106 are stabilized as shown, changing frequency $F_{LO}$ is as simple as locking to different modes of cavity 170, with adjacent mode spacing of $$\Delta f_r = \frac{c}{2n_r L_r}$$

as illustrated in FIG. 7a, a spectrum of power p versus frequency f, where the two actual lasing modes are shown with solid lines and the modes of reference cavity 170 are shown with broken lines. For example, if $n_r=1$, $L_r=15$ cm, then the mode spacing (free spectral range) is 1 GHz, and $F_{LO}$ can be tuned in discrete steps of 1 GHz by locking to adjacent modes of cavity 170. Frequency spacing $F_{LO}$ is as accurate as the stability of cavity 170, which can be made extremely stable by choosing materials with low thermal-drift and by maintaining cavity 170 at a constant temperature. For the ultimate stability, cavity 170 additionally can be made tunable and locked to an external atomic transition line using well-known techniques in the art.

For servo-feedback of lasers 104 and 106 by stabilizer circuits 160 and 162, several laser parameters may be adjusted. For semiconductor lasers, operating temperature and current can be adjusted. For Nd:YAG lasers pumped by diode lasers, temperature of gain medium, pumping power incident on gain medium, and laser cavity length can be adjusted. Additional control elements can also be incorporated into a laser cavity, such as an electro-optical phase-modulator.

5. Enhanced mixer

For operating at submillimeter-wave frequency, mixing section 64 of mixer element 60 has to be quite thin, limited by $t_m$ as discussed earlier. This results in inefficient absorption of incident optical LO power. Most incident optical LO power travels through mixing section 64 without being absorbed and therefore wasted. Absorption in mixing section 64, or in any other photosensitive devices such as a PIN diode or a photoconductive device, can be enhanced dramatically by the addition of optical reflectors. Several enhanced mixers are shown in FIGS. 6a, 6b, 6c, 6d, and 6e. The incident directions of optical LO power at frequency $F_O$ are indicated by the arrows.

Figures 6A, 6B, 6C, 6D, 6E:
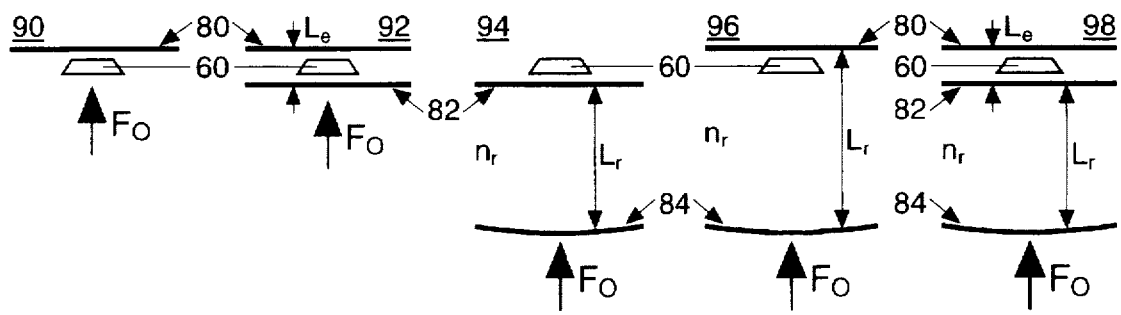
FIGS. 6a, 6b, 6c, 6d, and 6e are schematic diagrams of enhanced mixers according to the invention.

In an enhanced mixer 90 shown in FIG. 6a, an optical reflector 80 is located on one side of mixer element 60 represented by a trapezoidal symbol. The incident optical LO power passes through mixer element 60 twice, thereby enhancing the optical absorption by a factor of two.

In an enhanced mixer 92 shown in FIG. 6b, mixer element 60 is positioned inside a short Fabry-Perot cavity with cavity length $L_e$, formed by two optical reflectors 80 and 82, where $L_e$ is equal to several half-wavelengths at frequency $F_O$ and less than one half-wavelength at frequency $F_{LO}$. FIG. 7b illustrates the operating condition for enhanced mixer 92, where the two lasing modes at frequencies $F_{O1}$ and $F_{O2}$ are centered in a cavity mode of the short Fabry-Perot cavity with linewidth $\delta f_e > F_{LO}$. In this spectrum, vertical axis p is power and horizontal axis f is frequency, and the optical LO output is shown with solid lines and the cavity mode is shown with a broken line. FIG. 7c illustrates the optical intensity profile versus distance inside enhanced mixer 92 at the operating condition, where the high intensity inside the short Fabry-Perot cavity increases the total optical LO power absorbed by mixer element 60 many times.

In an enhanced mixer 94 shown in FIG. 6c, two optical reflectors 82 and 84 form a long Fabry-Perot cavity with cavity length $L_r$, adjacent to mixer element 60. Optical absorption of mixer element 60 is not enhanced, but a cavity suitable for use as a reference cavity is created.

In an enhanced mixer 96 shown in FIG. 6d, mixer element 60 is positioned inside a long Fabry-Perot cavity with cavity length $L_r$, formed by two optical reflectors 80 and 84, where $L_r$ is equal to or more than one half-wavelength at frequency $F_{LO}$ and optical absorption of mixer element 60 is enhanced many times. However, the maximum finesse available from this long cavity is significantly reduced by the absorptive mixer element 60, making this long cavity less satisfactory for use as a reference cavity.

In an enhanced mixer 98 shown in FIG. 6e, mixer element 60 is positioned inside a short Fabry-Perot cavity with cavity length $L_e$ in tandem with a long Fabry-Perot cavity with cavity length $L_r$, formed by three optical reflectors 80, 82, and 84, where $L_e$ is equal to several half-wavelengths at frequency $F_O$ and less than one half-wavelength at frequency $F_{LO}$, and $L_r$ is equal to or more than one half-wavelength at frequency $F_{LO}$. Operating condition illustrated in FIG. 7b also applies to enhanced mixer 98. FIG. 7d illustrates the optical intensity profile versus distance inside enhanced mixer 98 at the operating condition, where the high intensity inside the short Fabry-Perot cavity increases the total optical LO power absorbed by mixer element 60 many times. The intensity profile also shows that the highest finesse available from the long cavity is unaffected by the absorptive mixer element 60, making this long Fabry-Perot cavity ideal as a reference cavity for optical LO stabilization.

FIG. 8a illustrates one specific embodiment of enhanced mixer 98. In this embodiment, optical reflectors 80, 82, and 84 are stacks of layers of material optically transparent at frequency $F_O$. The layers are quarter-wavelength thick in optical thicknesses and alternating in indices of refraction. The number of layers in each stack is determined by the optical reflectivity required for each optical reflector 80, 82, or 84. Optical reflector 80 is divided into two different sections. Metal contact 66, a part of mixer element 60, also functions as optical reflector 80 over mixer element 60. The other section of optical reflector 80 is made of two materials with different indices of refraction $n_1$ and $n_2$, for example silicon nitride and silicon dioxide with indices of refraction 2.0 and 1.46, deposited by chemical vapor deposition or sputtering. Optical reflector 82 is made of two materials with different indices of refraction $n_3$ and $n_4$, for example InGaAsP and InP with indices of refraction 3.55 and 3.17 at 1.55 μm wavelength deposited by OMVPE. The long cavity comprises a transparent substrate 72 with index of refraction $n_5$, for example InP with index of refraction 3.17 at 1.55 μm wavelength. Optical reflector 84 is made of two materials with different indices of refraction $n_6$ and $n_7$, for example silicon dioxide and silicon nitride. Reflector 84 is curved to allow focusing of incident optical LO beam into a small spot at mixer element 60 and to decrease optical losses from diffraction in the long Fabry-Perot cavity. The incident direction of optical LO power at frequency $F_O$ is indicated by an arrow.

FIG. 8b illustrates another specific embodiment of enhanced mixer 98. In this embodiment, optical reflectors 80, 82, and 84 are layers of metal film of various thicknesses depending on the reflectivity required, designated by m. An extended metal contact for mixer element 60 also functions as optical reflector 80. A layer of transparent dielectric material with index of refraction $n_8$, for example silicon dioxide, is deposited on the semiconductor surface, except over mixer element 60, to isolate the extended metal contact and to reduce parasitic capacitance. An extended contact section 68 with index of refraction $n_9$, for example AlGaAs, is deposited on substrate 72, for example GaAs, to allow electrical contact and to support mixer element 60. Substrate 72 is etched away completely from the underside of mixer element 60. Reflector 82 is formed on extended contact section 68 by depositing a layer of metal film, which also serves as electrical contact and heat sink. A layer of metal film deposited on a focusing lens 86 serves as reflector 84. Reflector 84 is curved to allow focusing of incident optical LO beam into a small spot at mixer element 60 and to decrease optical losses from diffraction in the long Fabry-Perot cavity. Open space with index of refraction $n_{10}$ between optical reflectors 82 and 84 serves as the cavity for the long Fabry-Perot cavity. The incident direction of optical LO power at frequency $F_O$ is indicated by an arrow.

Additions and modifications can be made to these two specific embodiments of enhanced mixer 98. For example, specific embodiments of optical reflectors 80, 82, and 84 can be selected from these two examples to form a new combination. Other fabrication procedures may be devised by those well-versed in the art-to form other equivalent structures. Additional elements, such as an electro-optic phase-modulator can be integrated into the short Fabry-Perot cavity or long Fabry-Perot cavity to allow electrical tuning of cavity resonance modes. Lens 86 can be mounted on piezo-electric actuators to allow external tuning of the long Fabry-Perot cavity resonance modes, for example to allow locking to an external atomic transition line for the stabilization of the reference cavity. Optical amplification elements can also be integrated into the short Fabry-Perot cavity or long Fabry-Perot cavity to allow enhancement of incident optical LO power.

6. Indirect heterodyne receiver with enhanced mixer

For the following description, enhancement cavity refers to the short Fabry-Perot cavity suitable for increasing optical absorption in mixer element 60 and reference cavity refers to the long Fabry-Perot cavity suitable for optical LO stabilization.

In FIG. 9, an enhanced mixer 98 is applied to the indirect heterodyne receiver with a stabilized optical LO source. The stabilized optical LO source is the same as in FIG. 5, except that the two optical beam splitters 126 and the optical beam combiner 124 for producing a separate optical LO output are eliminated. The optical output from optical beam combiner and directional coupler 128 is directly injected into enhanced mixer 98 with integrated reference cavity and enhancement cavity. Optical reflection from the reference cavity is directed through coupler 128 into detector 150 for optical LO stabilization. Mixer element 60 mixes the optical input at frequencies $F_{O1}$ and $F_{O2}$ from stabilized optical LO source with an incident weak signal at frequency $F_S$ to produce an output signal at a lower frequency $F_{IF}$.

The indirect heterodyne receiver with enhanced mixer has several unique advantages. No optical power is wasted for a separate reference cavity and a separate optical LO output. All available laser power is directed through the integrated reference cavity to allow for maximum frequency stability, since the effectiveness of the laser servo-feedback depends on the strength and the signal to noise ratio of the reflected signal. Alignment for optical LO power injection into the reference cavity and the mixer element can be done in one step instead of separate alignments. In addition to frequency mixing, the mixer element can also serve as a detector for aligning incident optical LO beam and for locating Fabry-Perot modes for optical LO stabilization. Radio-frequency phase-modulations introduced for optical LO stabilization is reflected back to detector 150 by the integrated reference cavity. The integrated reference cavity also shields the mixer element from any instantaneous frequency shift, amplitude noise, or phase noise from the optical LO source, because the optical LO source contributes only a small amount of incident power compared to the total average power stored inside the cavity at any one moment in time. The result is a receiver that is power efficient, frequency stable, simple to use, low noise, and extremely compact and light weight.

Figure 10A:
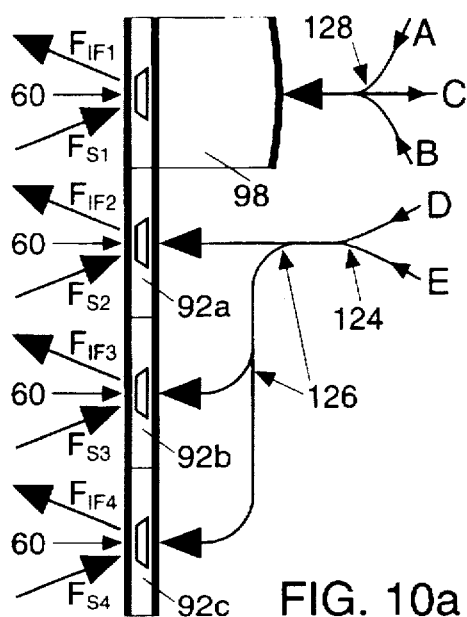
FIGS. 10a and 10b are schematic diagrams of two multiple-receiver arrays according to the invention.
Figure 10B:
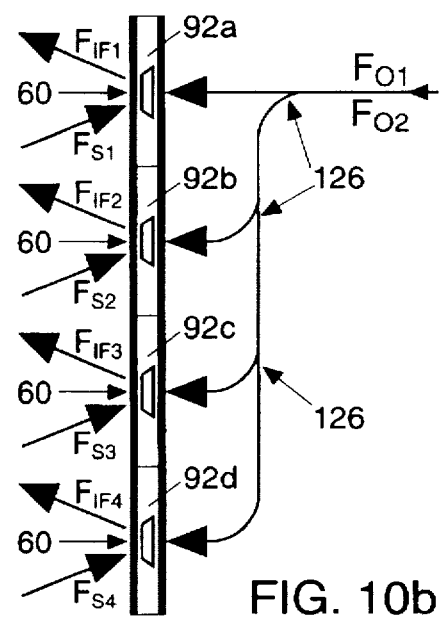

Extension of the indirect heterodyne receiver into multiple-receiver arrays is straightforward. FIG. 10a illustrates a multiple-receiver array comprising a "master" enhanced mixer 98 with integrated reference cavity for optical LO stabilization and three "slave" enhanced mixers 92a, 92b, and 92c, all driven by the same stabilized optical LO source shown in FIG. 9 with the appropriate connections indicated by letters A, B, C, D, and E. Additional optical beam combiner 124 and optical beam splitters 126 are incorporated to distribute optical LO power among mixers 92a, 92b, and 92c. FIG. 10b illustrates a multiple-receiver array driven by the stabilized optical LO source shown in FIG. 5. Additional optical beam splitters 126 are incorporated to distribute optical LO power among enhanced mixers 92a, 92b, 92c, and 92d. These multiple-receiver arrays are useful for applications where a large number of receivers would operate simultaneously to form an image.

SUMMARY, RAMIFICATION, AND SCOPE OF INVENTION

Accordingly, the indirect heterodyne receiver, mixer element, and various enhanced mixers and receiver combinations have been described. Many disadvantages and constraints of the prior-art receiver have been eliminated.

(a) Complex diplexer requiring substantial space is eliminated.

(b) Reliable receivers can be made based entirely on solid-state technology.

(c) Receiver frequency is stable and easily tunable.

(d) Power efficiency is maximized and power consumption is minimized.

(e) Rugged receivers can be made that are extremely compact and light-weight.

(f) Receiver operation is simple and straightforward with no routine maintenance required.

(g) Receiver operation does not require liquid-helium temperatures.

While my above description contains many specificities, these should not be construed as limitations on the scope of the invention, but rather as an exemplification of preferred embodiments thereof. Many other variations are possible. For example, instead of using a metal wire to conduct signals in and out of the mixer element, an antenna can be integrated directly as a part of the metal contact. Lasers for optical LO can be stabilized using the transmitted beam from the Fabry-Perot reference cavity instead of the reflected beam. Lasers can be locked to the side of the cavity mode instead of the center as in the Pound-Drever technique.

Accordingly, the scope of the invention should be determined not by the embodiments illustrated, but by the appended claims and their legal equivalents.

I claim:

1. A coherent receiver for electromagnetic radiation comprising:

an input optics means for collecting an input signal of electromagnetic radiation at a frequency $F_S$ lower than approximately $10^{13}$ Hz, an optical local oscillator means for generating an optical signal at a frequency $F_O$ higher than approximately $3 \times 10^{13}$ Hz, said optical signal is amplitude-modulated at a frequency $F_{LO}$ lower than approximately $10^{13}$ Hz, a mixer element means responsive simultaneously to said frequencies $F_S$, $F_O$, and $F_{LO}$, wherein said input signal is injected electrically into said mixer element means and said optical signal is injected optically into said mixer element means to produce an output signal at a frequency $F_{IF}$ substantially equal to the difference between said frequencies $F_S$ and $F_{LO}$, and an electronics means connected to said mixer element means for processing said output signal.

2. A receiver according to claim 1, wherein said optical local oscillator means comprises two nearly-monochromatic light sources at two frequencies $F_{O1}$ and $F_{O2}$ separated in frequency by said frequency $F_{LO}$ and centered in frequency around said frequency $F_O$.

3. A receiver according to claim 2, wherein said light sources at said frequencies $F_{O1}$ and $F_{O2}$ are stabilized by locking to two cavity modes of a reference optical resonant-cavity.

4. A receiver according to claim 1, wherein said mixer element means comprises:

a metal contact, a mixing section of a thickness t and an average doping concentration d, said mixing section comprising semiconductor materials optically absorbing at said frequency $F_O$, a Schottky barrier formed from said metal contact and said mixing section, and a contact section comprising semiconductor materials optically transparent at said frequency $F_O$, said contact section adjoins said mixing section.

5. A receiver according to claim 4, wherein said optical local oscillator means comprises two nearly-monochromatic light sources at two frequencies $F_{O1}$ and $F_{O2}$ separated in frequency by said frequency $F_{LO}$ and centered in frequency around said frequency $F_O$.

6. A receiver according to claim 5, wherein said light sources at said frequencies $F_{O1}$ and $F_{O2}$ are stabilized by locking to two cavity modes of a reference optical resonant-cavity.

7. A receiver according to claim 4, wherein said thickness t is smaller than $$t_m = \frac{v_n}{F_{LO}},$$

where $v_n$ is the maximum electron-drift velocity of said semiconductor materials in said mixing section, and said average doping concentration d is higher than $$d_m = \frac{2\epsilon_s V_{bi}}{q t_m^2},$$

where $\epsilon_s$ is the dielectric permittivity of said semiconductor materials in said mixing section, $V_{bi}$ is the built-in potential of said Schottky barrier, and q is the electrical charge of an electron.

8. A receiver according to claim 7, wherein said optical local oscillator means comprises two nearly-monochromatic light sources at two frequencies $F_{O1}$ and $F_{O2}$ separated in frequency by said frequency $F_{LO}$ and centered in frequency around said frequency $F_O$.

9. A receiver according to claim 8, wherein said light sources at said frequencies $F_{O1}$ and $F_{O2}$ are stabilized by locking to two cavity modes of a reference optical resonant-cavity.

10. A receiver according to claim 7, wherein said mixer element means is positioned inside an enhancement optical resonant-cavity, whereby the total optical power absorbed by said mixer element means from said optical signal at said frequency $F_O$ is increased.

11. A receiver according to claim 10, wherein said optical local oscillator means comprises two nearly-monochromatic light sources at two frequencies $F_{O1}$ and $F_{O2}$ separated in frequency by said frequency $F_{LO}$ and centered in frequency around said frequency $F_O$.

12. A receiver according to claim 11, wherein said light sources at said frequencies $F_{O1}$ and $F_{O2}$ are stabilized by locking to two cavity modes of a reference optical resonant-cavity.

13. A receiver according to claim 12, wherein said reference optical resonant-cavity is integrated with said mixer element means, said optical signal is injected through said reference optical resonant-cavity into said mixer element means.

14. A method for receiving electromagnetic radiation at a frequency $F_S$ lower than approximately $10^{13}$ Hz, comprising:

providing an input optics means to collect an input signal at said frequency $F_S$, providing an optical local oscillator means to generate an optical signal at a frequency $F_O$ higher than approximately $3 \times 10^{13}$ Hz, said optical signal is amplitude-modulated at a frequency $F_{LO}$ lower than approximately $10^{13}$ Hz, providing a mixer element means responsive simultaneously to said frequencies $F_S$, $F_O$, and $F_{LO}$, injecting said input signal electrically into said mixer element means and injecting said optical signal optically into said mixer element means to produce an output signal at a frequency $F_{IF}$ substantially equal to the difference between said frequencies $F_S$ and $F_{LO}$, and providing an electronics means connected to said mixer element means to process said output signal at said frequency $F_{IF}$.

15. A method according to claim 14, wherein said optical signal is generated by providing said optical local oscillator means comprising two nearly-monochromatic light sources at two frequencies $F_{O1}$ and $F_{O2}$ separated in frequency by said frequency $F_{LO}$ and centered in frequency around said frequency $F_O$.

16. A method according to claim 14, wherein said input signal and said optical signal is injected into said mixer element means comprising:

a metal contact, a mixing section of a thickness t and an average doping concentration d, said mixing section comprising semiconductor materials optically absorbing at said frequency $F_O$, a Schottky barrier formed from said metal contact and said mixing section, and a contact section comprising semiconductor materials optically transparent at said frequency $F_O$, said contact section adjoins said mixing section.

17. A method according to claim 16, wherein said optical signal is generated by providing said optical local oscillator means comprising two nearly-monochromatic light sources at two frequencies $F_{O1}$ and $F_{O2}$ separated in frequency by said frequency $F_{LO}$ and centered in frequency around said frequency $F_O$.

18. A method according to claim 17, wherein said optical signal is stabilized by locking said light sources at said frequencies $F_{O1}$ and $F_{O2}$ to two cavity modes of a reference optical resonant-cavity.

19. A method according to claim 17, wherein said mixing section of said mixing element means is provided with said thickness t smaller than $$t_m = \frac{v_n}{F_{LO}},$$

where $v_n$ is the maximum electron-drift velocity of said semiconductor materials in said mixing section, and provided with said average doping concentration d higher than $$d_m = \frac{2\epsilon_s V_{bi}}{q t_m^2},$$

where $\epsilon_s$ is the dielectric permittivity of said semiconductor materials in said mixing section, $V_{bi}$ is the built-in potential of said Schottky barrier, and q is the electrical charge of an electron.

20. A method according to claim 19, wherein the total optical power absorbed by said mixer element means from said optical signal at said frequency $F_O$ is increased by positioning said mixer element means inside an enhancement optical resonant-cavity.

* * * * *